(12) United States Patent
Hsu et al.

(10) Patent No.: US 8,863,076 B2
(45) Date of Patent: Oct. 14, 2014

(54) TRIGGERED EVENT HANDLER ADDITION

(71) Applicant: Axure Software Solutions, Inc., San Diego, CA (US)

(72) Inventors: Victor Hsu, San Diego, CA (US); Martin Smith, San Diego, CA (US); Ben Fraser, Encinitas, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 0 days.

(21) Appl. No.: 13/833,831

(22) Filed: Mar. 15, 2013

(65) Prior Publication Data

US 2014/0282365 A1 Sep. 18, 2014

(51) Int. Cl.
G06F 9/44 (2006.01)
G06F 3/00 (2006.01)
G06F 3/048 (2013.01)

(52) U.S. Cl.
CPC ...................................... *G06F 8/20* (2013.01)
USPC ............ 717/104; 715/762; 715/764; 715/779

(58) Field of Classification Search
CPC ......... G06F 8/34; G06F 3/048; G06F 9/4443; G06F 2201/875; G06F 8/38; G06F 9/45529
See application file for complete search history.

(56) References Cited

U.S. PATENT DOCUMENTS

| | | | |
|---|---|---|---|
| 6,212,672 B1 * | 4/2001 | Keller et al. .................. | 717/104 |
| 7,174,286 B2 | 2/2007 | Martin et al. | |
| 7,349,837 B2 | 3/2008 | Martin et al. | |
| 7,490,295 B2 * | 2/2009 | Chaudhri et al. ............. | 715/764 |
| 7,788,647 B2 | 8/2010 | Martin et al. | |
| 7,861,158 B2 | 12/2010 | Martin et al. | |
| 8,234,622 B2 * | 7/2012 | Meijer et al. .................. | 717/104 |
| 2006/0015818 A1 * | 1/2006 | Chaudhri et al. ............. | 715/779 |
| 2007/0168931 A1 * | 7/2007 | Martin et al. ................. | 717/104 |
| 2009/0313601 A1 * | 12/2009 | Baird et al. .................... | 717/106 |
| 2010/0037157 A1 * | 2/2010 | Chang et al. .................. | 715/764 |
| 2012/0110482 A1 * | 5/2012 | Zhang et al. .................. | 715/762 |
| 2012/0151325 A1 * | 6/2012 | Steelberg et al. ............. | 715/234 |
| 2012/0174002 A1 | 7/2012 | Martin et al. | |
| 2012/0227032 A1 * | 9/2012 | Zhang et al. .................. | 717/121 |
| 2012/0291005 A1 | 11/2012 | Quine | |
| 2012/0324428 A1 | 12/2012 | Ryan et al. | |
| 2013/0091416 A1 * | 4/2013 | Villoslada De La Torre et al. ............................. | 715/234 |
| 2013/0132809 A1 * | 5/2013 | Tseng et al. .................. | 715/205 |
| 2013/0159894 A1 * | 6/2013 | Park et al. ..................... | 715/762 |

OTHER PUBLICATIONS

Domenico Amalfitano et al.; A GUI Crawling-based technique for Android Mobile Application Testing; 2011 IEEE; pp. 252-261; <http://ieeexplore.ieee.org/stamp/stamp.jsp?tp=&arnumber=5954416>.*

(Continued)

*Primary Examiner* — Thuy Dao
*Assistant Examiner* — Cuong V Luu
(74) *Attorney, Agent, or Firm* — The Mueller Law Office, P.C.

(57) ABSTRACT

Embodiments of the present invention provide an intuitive method for the specification of a design as follows. A widget is added to the design at the direction of a user. The widget has an event and an event handler. A second widget is added to the design. The design is exported from a design program and an instantiation of the design is created that is capable of being rendered by an external player. Executing the event handler adds a second event handler to a second widget in the instantiation of the design.

15 Claims, 5 Drawing Sheets

(56) References Cited

OTHER PUBLICATIONS

Philippe A. Palanque et al.; Design of User-Driven Interfaces Using Petri Nets and Objects; 2005 Springer; pp. 569-585; <http://link.springer.com/chapter/10.1007/3-540-56777-1_30#p.-1>.*

Cor-Paul Bezemer et al.; Automated security testing of web widget interactions; 2009 ACM; pp. 81-90; <http://dl.acm.org/citation.cfm?id=1595711>.*

David Navarre et al.; ICOs A Model-Based User Interface Description Technique dedicated to Interactive Systems Addressing Usability, Reliability and Scalability; 2009 ACM; 56 pages; <http://dl.acm.org/citation.cfm?id=1614393>.*

Svetoslav Ganov et al.; Test generation for graphical user interfaces based on symbolic execution; 2008 ACM; pp. 33-40; <http://dl.acm.org/citation.cfm?id=1370050>.*

Malte Appeltauer et al.; Event Specific software composition in context oriented programming; 2010 Springer; pp. 50-65; <http://link.springer.com/chapter/10.1007/978-3-642-14046-4_4>.*

Eliminating Web Development Complexity, Product Page, Wavemaker, VMware, Inc, Accessed on Mar. 28, 2013, www.wavemaker.com/product.

Glade—A User Interface Designer, Homepage, Accessed on Mar. 28, 2013, glade.gnome.org.

Open Souce HyperCard-related stuff, Hypercard, Accessed on Mar. 28, 2013, hypercard.org.

* cited by examiner

TRIGGERED EVENT HANDLER ADDITION

BACKGROUND OF THE INVENTION

Design programs allow people to specify various designs such as text documents, web pages, spreadsheets, and illustrations. These programs are faced with two important, but somewhat contradictory objectives. First, the programs must be easy to learn how to use. The consumer market for software has no tolerance for steep learning curves. Gone are the days where users were willing to spend hours reading through a manual to figure out how to use a particular software tool. In some markets, the learning curve for a piece of software must be nearly vertical if the software is to have any chance of being adopted. Second, design programs must offer a user sufficient flexibility to create the design of their choosing. These objectives conflict because of the basic fact that additional options mean additional complexity; while easy adoption necessitates simplicity.

Design programs used for the development of web pages are illustrative of the conflicting pressures facing software developers. Web page design programs need to generate web browser experiences that include design patterns that are specified by a user. The most basic example of a design pattern is the ability to click on a segment of text to trigger the presentation of a different web page by a web browser. From these simple beginnings, the web browsing experience has been enhanced to an unprecedented degree. Modern design program users expect to be able to implement an almost limitless array of design patterns. At the same time, it is advantageous to provide design programs that can be adopted by the ever increasing portion of the population that would like to create their own websites. It is for these reasons that web design programs so acutely feel the effects of the two conflicting pressures mentioned above.

There are two popular approaches in the related art for providing web design programs with the ability to give their users a rich design environment through the use of an intuitive interface. The first approach is to provide a large library of predesigned patterns to a user of a design program. The second approach is to provide a user with a more limited set of pattern elements and the flexibility to define the interaction of those elements as the designer sees fit. The two approaches each fulfill only one of the market pressures described above, but neither of them form a complete solution to the combined problem. Both approaches are described below in the context of a user designing a web store where the desired pattern is the presentation of a pop out box illustrating an image of a product when a link is selected.

In the first approach, a user will essentially only have to select the desired pattern from a library. This approach can also involve providing the ability to slightly customize the pattern through the use of a menu interface. For example, a user could scan the library to find a predesigned pop out box widget that would provide the desired pattern. The user would then be able to modify the widget through the previously mentioned interface to set the desired characteristics of the widget to meet the pattern the user desired.

In the second approach, a user will have a more limited set of design elements at their disposal, but greater flexibility in defining the characteristics of each design element. Continuing with the example of a web store, the user might be provided with the ability to define a button and a pop out window. The user would then be able to modify the button and pop out window to each comprise a specific event and an associated event handler. The event for the button would be an "on-click" event; and the event handler execution would cause the pop-out window to appear.

Both of the approaches have their drawbacks. In the first approach, creating the design program would be difficult because of the number of patterns that would need to be designed. This approach also diminishes the flexibility of a user because they are limited to the patterns that the design program can provide. Furthermore, as the number of predesigned patterns increased, the learning curve would also increase as the users would have to search through an increasingly large library. In the second approach, it may be difficult for a programmer to figure out how to implement a desired pattern. The program must think through how each element in a design pattern will interact from a top down perspective, and then relate the various design elements to specify the desired design experience. When specifying the pop out window, the designer will have to remember how the window got there in the first place, what the user is doing when the window is displayed, and what the user will want to do moving forward. Although this thought process is manageable in the context of a simple pop out window, this drawback is far more pronounced for more complex design patterns.

SUMMARY OF INVENTION

In one embodiment of the invention, a method is provided. According to the method a widget is added to the design at the direction of a user. The widget has an event and an event handler. A second widget is added to the design. The design is exported from a design program and an instantiation of the design is created that is capable of being rendered by an external player. Executing the event handler adds a second event handler to a second widget in the instantiation of the design.

In another embodiment of the invention, a design tool capable of executing a method is provided. A design environment is provided for a user of the design tool that allows a user to create a design. An event handler is added to the design. The event handler is defined by a user of the design tool and is associated with an event. The design is exported thereby creating an instantiation of the design that is capable of being rendered by an external player. When the event handler executes, a second event handler is added to the instantiation of the design.

In another embodiment of the invention, a method is provided. A design space is provided to a user of a design tool allowing the user to specify a design. A specification interface is provided to a user allowing the user to define specifications for the design. A specification is accepted from a user via the specification interface that specifies an action for the design to execute upon an occurrence. The design is export to produce an exported design. The action is executed upon the occurrence occurring in the exported design. The action involves the addition of a second specification to the exported design where the second specification defines a second action for the exported design to execute upon a second occurrence.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

The invention relates generally to design environments, and more specifically to the specification of design patterns in a design environment.

Figure 1:
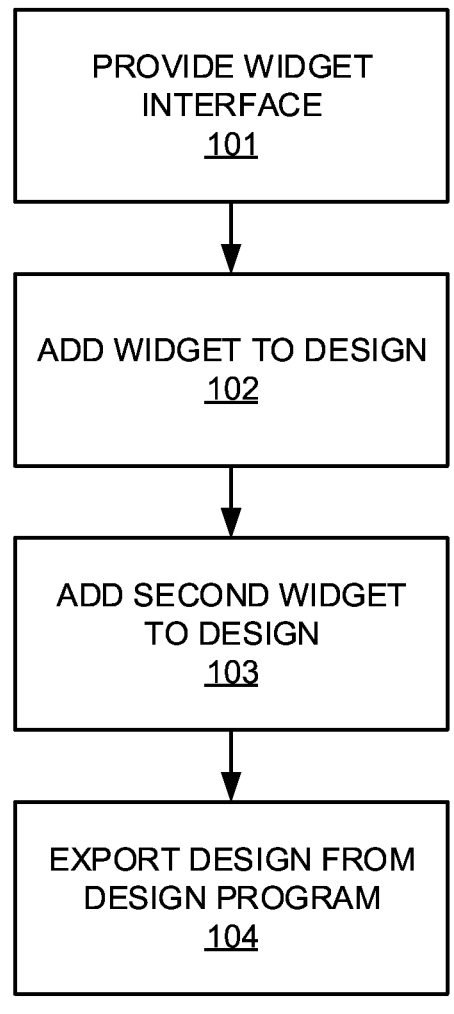
FIG. 1 illustrates a flow chart of a method for allowing a user to specify a design that is in accordance with embodiments of the present invention.

A method that is in accordance with embodiments of the present invention can be described with reference to FIGS. 1-3. FIG. 1 displays a method 100 conducted by a design program to allow a user to create a design. The method begins with step 101 in which a widget interface is provided to a user of the design program. The step can be executed by the computer system 200 shown in FIG. 2. The widget interface can be provided to the user through a combination of the components in computer system 200. The widget interface can be a portion of a design program that is running on processing system 201 in combination with memory 202. User 203 may be able to edit and view the design using information transported through routing system 204 and presented to or taken from user 203 through user interface system 205.

The widget interface is part of the design program and is used by the user to create widgets for the design. In the context of web design, the widget could take various forms such as a button, a menu, the web page itself, a display window, a link, or any design element. The user 203 may be presented with a widget interface 101 in the form of a menu of widgets to add by dragging the widgets out of the menu. In step 102, a processing system such as processing system 201 will add the specified widget to the design.

The user could be allowed to add an event and an event handler to the widget. This could be done through the widget interface or some other means, and could be done either before or after the widget is added to the design. In the context of web design, the event specified could be any event that could take place during the time in which the design is being rendered to produce an end user experience. These events could include: a mouse click; the termination of a predetermined period of time; a cursor movement; or any input received from an end user such as a touch screen input or verbal input. In the same context, an event handler could execute any action that a design is capable of executing. For example, an event handler could modify the appearance of a design element, hide a design element, save a unit of information, or output a design element to user interface system 205 in any format.

Steps 101 and 102 may repeat as many times as necessary for the user to specify the design. Step 103 involves the addition of a second widget to the design. The second widget can be brought in to the design through the use of the widget input interface from step 101. The user 203 can then determine how the two widgets interact to achieve the desired design pattern. In particular, the user 203 can set an event handler of the widget defined in step 102 to add an event handler to the widget defined in step 103.

In step 104, the design is exported from the design program. This will create a separate instantiation of the design that is capable of being rendered by an external player. In the web design context, the external player will be a web browser. In such a case, the separate instantiation may be an HTML and CSS encoded instantiation of the design and may alternatively or cumulatively be a Javascript encoded instantiation of the design. Note that the design program may be a prototyping tool in which case the design may be rendered internally to the player using an instantiation of the design that uses a different encoding than the exported instantiation.

Figure 3:
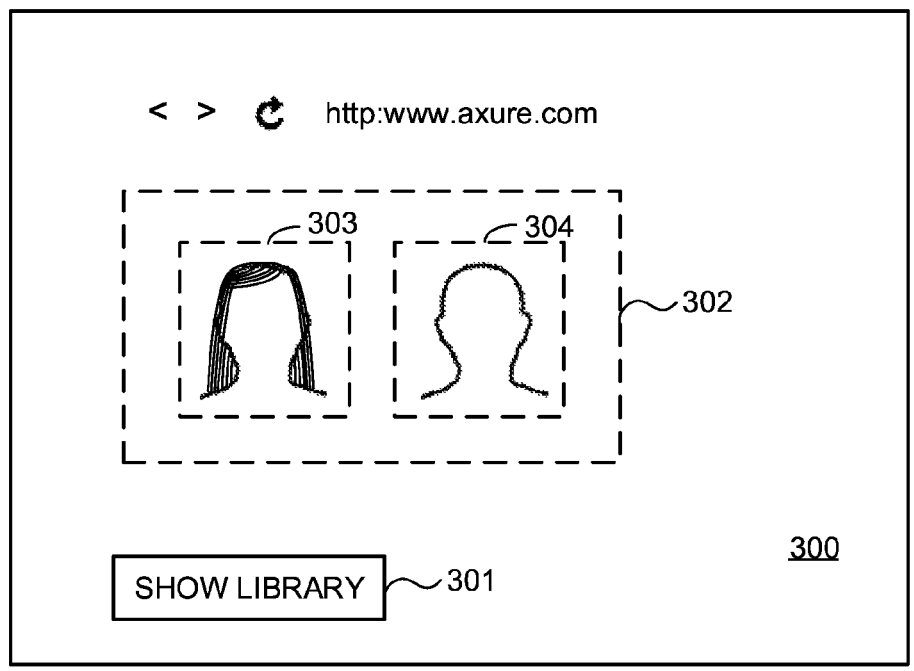
FIG. 3 illustrates an example design in the form of a web page.

FIG. 3 depicts a visual representation of a design that was exported in accordance with step 104 and then rendered by an external player. In the specific example depicted in FIG. 3, the design is a web page 300. The web page in this example provides a user with access to an image library 302 from which to select images. The image library 302 is illustrated with dotted lines because it is not visible until a user selects the show library button 301. The image library 302 contains two image frames 303 and 304 that are likewise illustrated using dotted lines because they are not visible until the image library is selected. The widget in this design that was specified in step 103 of method 100 is image library 302. The other widget that is directly pertinent to this discussion is image frame 303 which was specified in step 102 of method 100.

The design pattern provided by web page 300 allows a user to select an image from an image library and proceeds as follows. A user selects show library button 301. The library window 302 appears overlaid over the background of web page 300 with image frame 303 and image frame 304 presented within the library window 302. The end user is then able to select either image frame 303 or 304 in which case the boarder of the image frame will change slightly to indicate that the image has been selected. At this point, the user may close the library by clicking on the library window 302. Before an image is selected, clicking on the library window 302 will have no effect, because an image has not yet been selected.

The method illustrated in FIG. 1 can be used to generate the design pattern discussed with reference to FIG. 3 in the following manner. Image frame 303 is added in step 102. The event associated with image frame 303 is an on-click event. The widget added in step 103 is the image library 302. The event handler associated with the on-click event in image frame 303 executes a frame-highlight action and an add-event-handler action. The particular event handler that is added by the add-event-handler action is added to an on-click event for the image library 302 that was defined in step 103. The event handler added to image library 302 can be a hide-widget event handler that hides image library 302. This produces a design having the desired design pattern described with reference to FIG. 3 because the image library 302 will not disappear when clicked until a picture has been selected.

Figure 2:
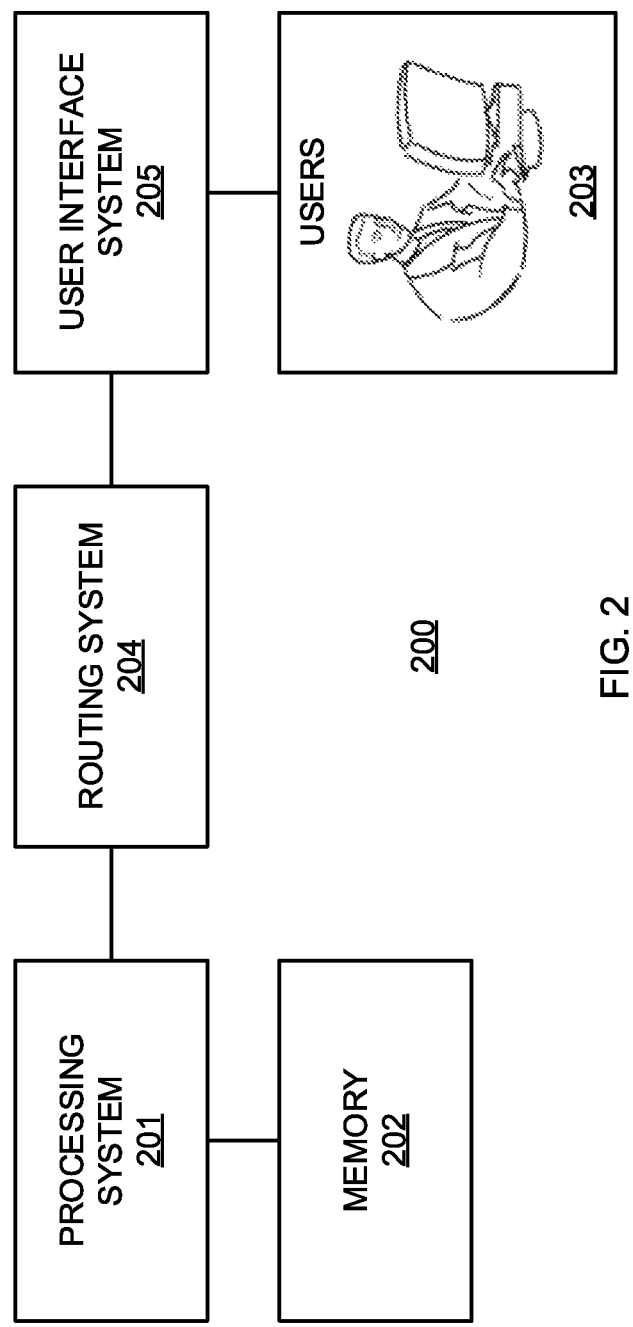
FIG. 2 illustrates a block diagram of a computer system that is capable of being used in accordance with embodiments of the present invention.

The method described with reference to FIGS. 1-3 represents a shift in the manner in which designs are specified. The method is particularly suited for the development of linear interactive designs. The disclosed method was illustrated above as executing a customized design pattern using extremely basic widgets. It is therefore an advance over solutions that seek to produce large libraries of complex widgets for every potential desired design pattern. The disclosed method is also an advantage over solutions that provide more basic elements with greater flexibility. This is because the described approach allows a user to specify a design using the same linear process that an end user will experience when the design is completed.

In the above example, the user specified the widget associated with image frame 303 while thinking of what will happen once the image is selected (i.e., when the image is selected, the design library will disappear when it is clicked). The user was able to specify this pattern directly when creating the widget associated with image frame 303 by making the event handler of the widget add another event handler to the widget associated with image library 302. The order of thinking required to specify this pattern therefore matches the pattern itself.

The design process described with reference to FIGS. 1-3 can be compared to a traditional approach in which the behavior of each widget is defined independently. In that case, a user will have the desired pattern in mind, but will have to unpack that pattern into what each component does. When specifying the widget associated with image library 302, the user will have to remember that the image library 302 will have appeared when button 301 is selected, should not disappear until an image frame such as image frame 303 has been selected, and should disappear when clicked once image frame 303 or another image frame has been selected. The designer will then have to program in a representation of each of these conditions into the widget, and define each of the other widgets involved independently to implement this pattern.

Figure 4:
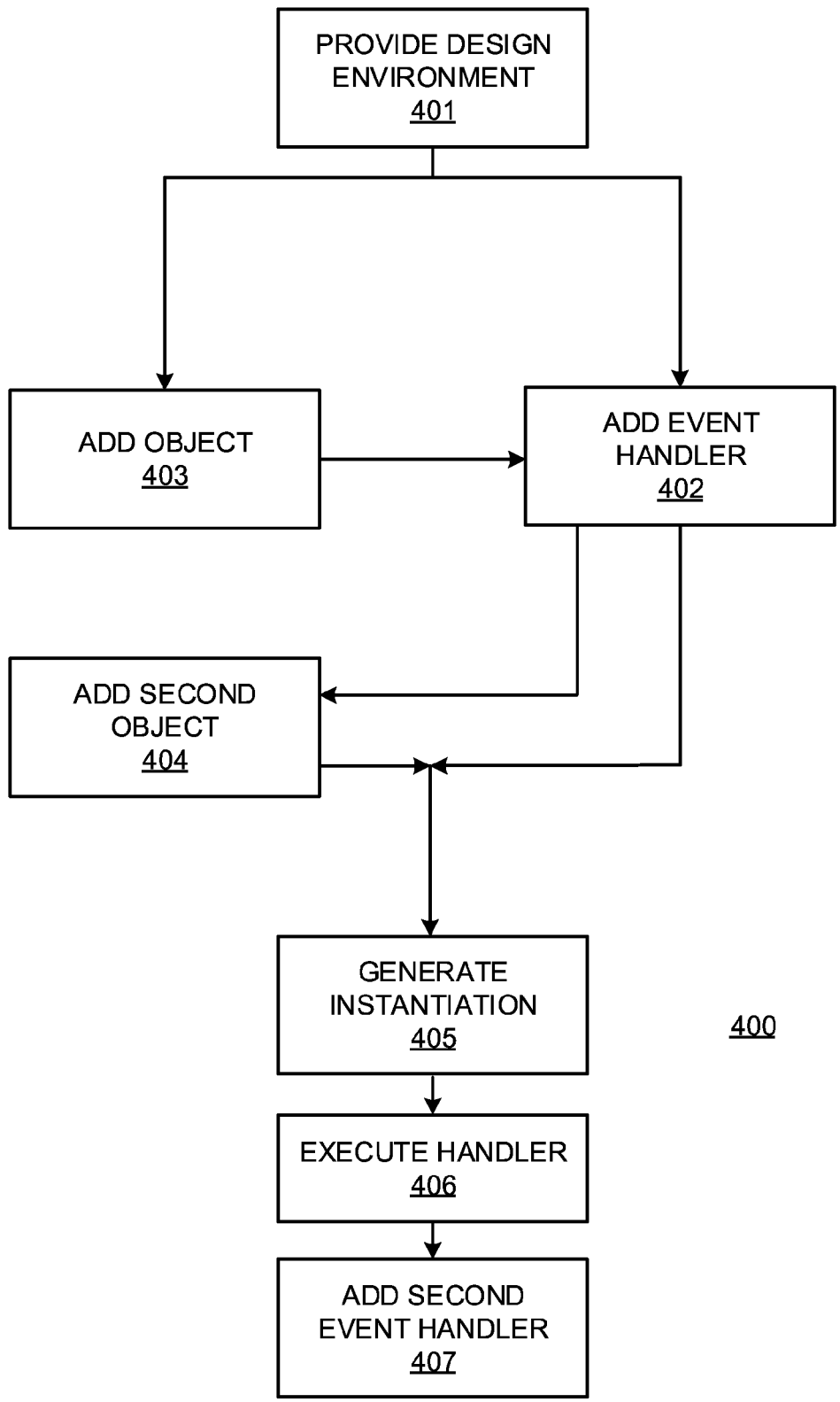
FIG. 4 illustrates a flow chart of a set of methods involving event handlers that is in accordance with embodiments of the present invention.

FIG. 4 illustrates a set of methods 400 that can be executed by a design tool that is in accordance with embodiments of the present invention. In specific embodiments of the invention, the design tool will be a prototyping tool. In step 401, a design environment is provided to a user via a computer system such as computer system 200. The design environment allows a user to create a design. In specific embodiments, the design tool will define interaction data for the design and the interaction data will be capable of being rendered by a web browser only after it has been exported from the design tool.

In step 402, an event handler is added to the design using a processing system such as processing system 201. The event handler is defined by a user of the design tool such as user 203. The event handler is associated with an event. As described above, the event can be any event that takes place while an end user experience of said design is being rendered. For example, the event could be a mouse click (i.e., an on-click event), audio cue, touch screen cue, the termination of a predetermined duration of time, or a cursor movement. Furthermore, the event could be any event taking place in a prototype rendering of the design. More generally, the event could be any event associated with the rendering of the design, the exportation of the design, or the generation of an instantiation of the design. As described above, the event handler will execute an action that can likewise be any action associated with the rendering of the design, the exportation of the design, or the generation of an instantiation of the design. In specific embodiments, the event handler will trigger an add-event-handler action as described above with reference to FIGS. 1-3. The add-event-handler action will add an additional event handler to an instantiation of the design as described below.

In step 403, an object is added to the design at the direction of a user such as user 203 via a computer system such as computer system 200. The object can be selected from a utility with pull down menus, buttons, and other prompts. The user can specify properties of the object such as its physical appearance and behavior in the design. For example, a user could define a button to be a specific size and shape and be provided with a text label. In specific embodiments, the object will be a widget. However, the object can generally be any programming construct capable of being independently conceptualized. The object may be a web page or a design element within a web page. A visual representation of the object may have a substantially quadrilateral shape and also may be rectangular. The purpose of the object may be to accept input data or to export output data. For example, the object may be used to display an image while an end user experience is rendered from the design.

Add event handler step 402 can serve to add an event handler to the object that was added in step 403. Also, add event handler step 402 can be conducted during or before the add object step 403. Add event handler step 402 is shown having a separate path because the event handler does not need to be associated with an object in the design, but can instead be added to the design independently.

Method 400 can continue with add second object step 404, or it may proceed directly to generate instantiation step 407. If the add second object step 404 is executed, it may proceed in the same general manner as steps 403 as described above. However, this second object will be configured to accept the second event handler mentioned above. Note that the second object can take on any of the forms described above for the first object, but the second object does not have to be the same type of object as the first object, and can indeed be a different type of object. In specific embodiments of the invention, both the first and second objects are widgets. In another set of specific embodiments of the invention, the second object will be a web page.

In step 405, an instantiation of the design is generated by the design tool. In specific embodiments, this instantiation will be capable of being rendered in an external player. For example, this step could involve the export of the design from the design tool through the creation of an encoded instantiation of the design using HTML and CSS Alternatively or cumulatively, the encoded instantiation of the design could comprise Javascript. The external player in these embodiments would be a web browser.

Step 407 can be triggered in multiple ways. Step 407 could be triggered by step 405 such that the second event handler would be added to the instantiation of the design as it was being generated—effectively skipping step 406 in method 400. For example, the event handler could be implemented directly in the encoded instantiation of the design. In this embodiment, there might be no detectable difference between the resulting instantiation and an instantiation of a design in which the second event handler was added during the design process using alternative methods. As the method described with reference to FIG. 4 is generally intended to assist the design process, there is little reason to retain traces of the design process in the exported or generated instantiation of the design. Step 406 could alternatively be the cause of step 407 such that the event handler would be added after generated instantiation was exported from the design environment. In this case, the second event handler would not be added until the occurrence of the event associated with the first event handler. In either situation, the method concludes with the addition of second event handler 407.

Step 407 can lead to multiple results. As described above, there are various possibilities for where the second event handler will be added in step 407. Generally, the second event handler will be added to an instantiation of the design. In cases in which method 400 was executed without passing through steps 403 or 404, the second event handler will be added to the design instantiation without being associated with a particular object. If instead the method included the addition of one of these two objects the second event handler could be added to either of these objects. Furthermore, the add second event handler step 407 could include adding the second event handler to an object that is dynamically created in the instantiation while an end user experience is being rendered therefrom.

Figure 5:
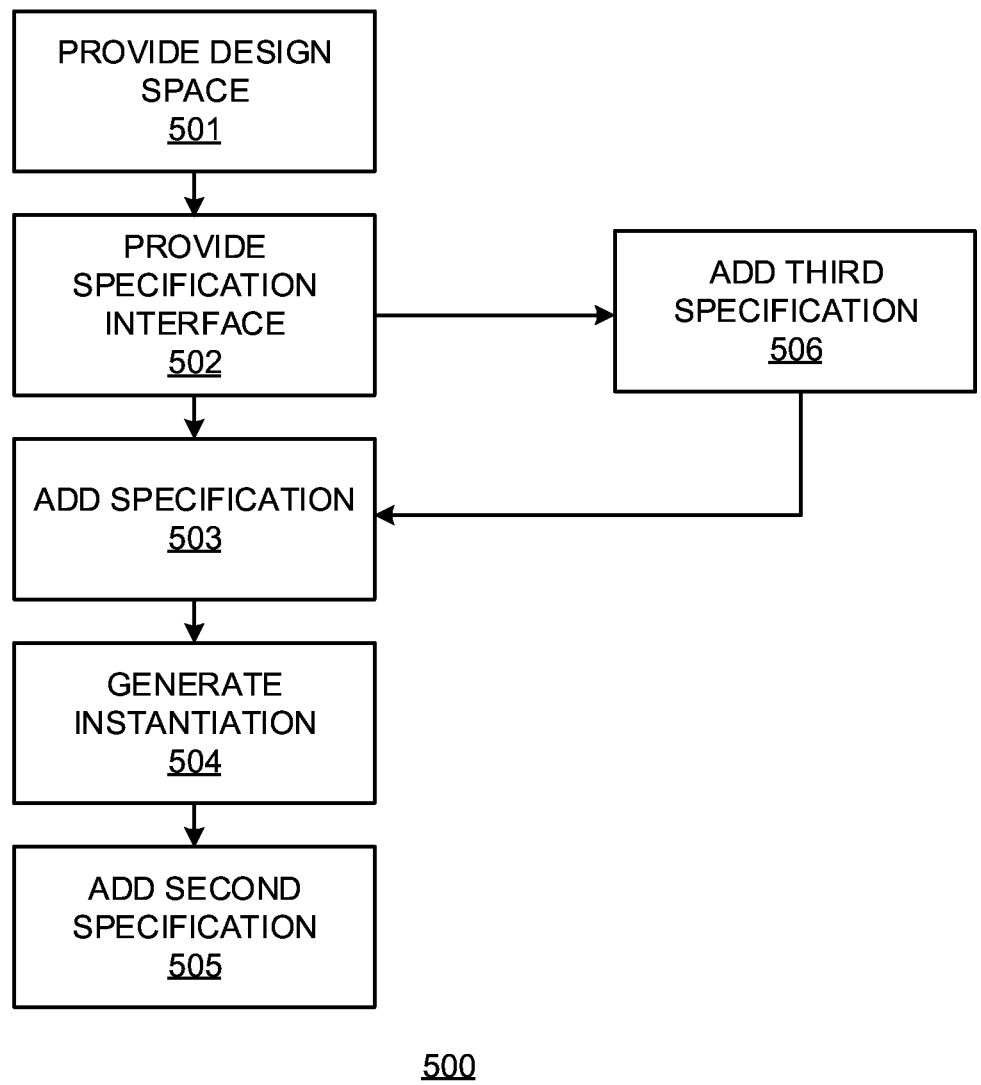
FIG. 5 illustrates a flow chart of a set of methods involving design specifications that is in accordance with embodiments of the present invention.

FIG. 5 illustrates a set of methods 500 that are in accordance with specific embodiments of the invention. In step 501, a design space is provided for a user of a design tool via a computer system such as computing system 200. The design space allows a user to specify a design. In step 502, a specification interface is provided to the user via a user interface system such as user interface system 205. The specification interface allows users to select and/or define specifications for the design through user interface system 205. In step 503, a specification that was selected and/or defined by the user in step 502 is accepted by the computing system such as computing system 200. This first specification defines an action for the design to execute upon an occurrence. For example, the first specification could be an event handler defining an add-event-handler action that will be executed when a user clicks on a web page. The first specification could also define an add-second-specification action which would cause a second specification to be added to an instantiation of the design when the occurrence associated with the specification occurred. In specific embodiments, the second specification could also define an action for the design to execute upon an occurrence. In specific embodiments, the specification can be a unitary design element comprising an occurrence specification and an action specification.

In step 504, an instantiation of the design is generated using a processor such as processing system 201. In specific embodiments, the instantiation will be capable of being rendered in an external player. Generating step 504 could trigger the action defined in the first specification described above. In keeping with the example in the previous paragraph that is directed to event handlers, generating step 504 could trigger the add-event-handler action such that the second event handler would be added to an instantiation of the design in step 505.

In step 506, a third specification is accepted via the specification interface. As before, the specification interface may be provided by a system such as user interface system 205. Both the first specification accepted in step 503 and the third specification accepted in step 506 can define unitary design elements. In specific embodiments of the invention, step 505 will involve adding the second specification to the third specification in an instantiation of the design when the occurrence associated with the first specification occurs.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention. For example, the design process described could be applied to allow users to generate light boxes, accordion menus, picture editing windows, and nearly any conceivable design pattern; the addition of an event handler could be triggered by an event taking place on a different processing system than the one used to render the instantiation of the design; the description has been focused on web design but the design processes and systems described are more broadly applicable to design programs in general; and the event handler that is added could add an additional event handler when it is executed. FIG. 2 is only an illustrative computer system that is amenable to operation in accordance with the present invention and variant computer system topologies may be used in its stead. Nothing in this description should limit the processor of processing system 201 to a single processor, as the function of this block can be accomplished by multiple physical processors located either on a single work station or distributed through a network. It is not essential for memory 202 to be physically distinguishable from processing system 201, as they are merely illustrated as separate blocks for purposes of invoking common conceptions of how computing systems operate. Routing system 204 could be the internal routing system of a single work station, a LAN, a WAN, a wired or wireless network, the Internet, or any other system capable of routing signals. User interface system 205 could be a work station, a computer, a mobile phone or other mobile device, or any computing device or group of computing devices capable of receiving inputs from a single user or group of users. FIG. 2 should also not be taken to indicate that the invention can only involve design environments or design programs that may only be accessed by one user as there could be multiple users 203 and that group of multiple users 203 could access the design environment using any number of routing systems 204. Those users could also access the design environment simultaneously. Furthermore, nothing in the disclosure should indicate that the invention is limited to systems and methods that involve web browsers. In general, any diagrams presented are only intended to indicate one possible configuration, and many variations are possible. Those skilled in the art will also appreciate that methods and systems consistent with the present invention are suitable for use in a wide range of applications encompassing any related to tools used to specify designs.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A computer-implemented method comprising:
   adding a first widget to a design in a design program using a processing system and at the direction of a user, said first widget having an event and an event handler, and said event and said event handler comprising user defined properties;
   adding a second widget to said design; and
   exporting said design comprising said first widget and said second widget from said design program, said exporting step creating an instantiation of said design that is capable of being rendered by an external player;
   wherein executing said event handler adds a second event handler to said second widget in said instantiation upon an occurrence defined by said event;

wherein said design is configured to add said second event handler to said second widget when said instantiation of said design is being rendered by said external player; and wherein said design program defines interaction data for said design, said interaction data capable of being rendered by a web browser only after it has been exported from said design program.

2. The computer-implemented method of claim 1, wherein said design program is a prototyping tool.

3. The computer-implemented method of claim 1, wherein said second widget is added to said instantiation of said design dynamically while said instantiation of said design is rendered by said external player.

4. The computer-implemented method of claim 3, wherein:
   said event associated with said first widget is an on-click event;
   said second widget is an overlay; and
   said second event handler is a hide-widget event handler.

5. A computer-instantiated design tool stored in a memory capable of executing a method, said method comprising:
   providing a design environment for a user of said design tool via a computer system, said design environment allowing said user of said design tool to create a design;
   adding a first event handler to said design using a processing system, said first event handler being defined by said user of said design tool, and said first event handler being associated with an event;
   adding a first object to said design using said processing system, said event and said first event handler comprising user defined properties of said first object;
   adding a second object to said design; and
   exporting said design, said exporting step creating an instantiation of said design that is capable of being rendered by an external player;
   wherein executing said first event handler adds a second event handler to said instantiation of said design;
   wherein said design is configured to add said second event handler to said second object when said instantiation of said design is rendered by the external player; and
   wherein said design tool defines interaction data for said design, said interaction data capable of being rendered by a web browser only after it has been exported from said design tool.

6. The computer-instantiated design tool of claim 5, wherein said second object is added to said instantiation of said design dynamically while said instantiation of said design is rendered by said external player.

7. The computer-instantiated design tool of claim 5, wherein:
   the external player is a browser, wherein the browser has an object model; and
   said second object is said document object in said object model of said browser.

8. The computer-instantiated design tool of claim 5, wherein said design tool is a prototyping tool.

9. The computer-instantiated design tool of claim 5, wherein a visual representation of said first object is rectangular.

10. The computer-instantiated design tool of claim 5, wherein said first object is used to display an image to an end user of said design.

11. A computer-implemented method comprising:
    providing a design space to a user of a design tool, via a computer system, said design space allowing said user of said design tool to specify a design;
    providing a specification interface for said user, via said computer system, said specification interface allowing said user of said design tool to define specifications for said design;
    accepting a first specification from said user via said specification interface, said first specification defining a first action for said design to execute upon a first occurrence, said first specification comprising a first unitary design element, and said first action involving addition of a second specification to said design;
    accepting a third specification from said user via said specification interface, said third specification specifying a second unitary design element; and
    exporting said design using a processor, said exporting step producing an exported design;
    wherein said first and second unitary design elements comprise widgets;
    wherein said first action is executed upon said first occurrence in said exported design; and
    wherein said first action involves addition said second specification to said third specification in said exported design, said second specification defining a second action for said exported design to execute upon a second occurrence.

12. The computer-implemented method of claim 11, wherein said design tool is a prototyping tool.

13. The computer-implemented method of claim 11, wherein said second action modifies said second unitary design element when executed.

14. The computer-implemented method of claim 11, wherein said second unitary design element is used to display an image to an end user of said design.

15. The computer-implemented method of claim 11, wherein said second unitary design element is added to said exported design dynamically while said exported design is rendered by an external player.

* * * * *